US012767386B2

(12) United States Patent
Zürcher

(10) Patent No.: US 12,767,386 B2
(45) Date of Patent: Oct. 20, 2026

(54) SPOUT PACKAGING STRUCTURE OF PACKAGING BOX, AND PACKAGING BOX

(71) Applicant: SIG SERVICES AG, Neuhausen am Rheinfall (CH)

(72) Inventor: Remo Zürcher, Suzhou (CN)

(73) Assignee: SIG SERVICES AG, Neuhausen am Rheinfall (CH)

( * ) Notice: Subject to any disclaimer, the term of this patent is extended or adjusted under 35 U.S.C. 154(b) by 150 days.

(21) Appl. No.: 18/993,696

(22) PCT Filed: Jul. 14, 2023

(86) PCT No.: PCT/CN2023/107496
§ 371 (c)(1),
(2) Date: Jan. 13, 2025

(87) PCT Pub. No.: WO2024/017166
PCT Pub. Date: Jan. 25, 2024

(65) Prior Publication Data

US 2026/0008586 A1 Jan. 8, 2026

(30) Foreign Application Priority Data

Jul. 18, 2022 (CN) ........................ 202210843849.X
Jul. 18, 2022 (CN) ........................ 202210845148.X

(51) Int. Cl.
*B65D 5/74* (2006.01)
*F16B 33/00* (2006.01)
*F16B 33/02* (2006.01)

(52) U.S. Cl.
CPC .............. *B65D 5/748* (2013.01); *B65D 5/747* (2013.01); *F16B 33/006* (2013.01); *F16B 33/02* (2013.01)

(58) Field of Classification Search
CPC .......... B65D 5/748; B65D 5/74; B65D 5/746; B65D 5/747; B65D 5/749; F16B 33/006; F16B 33/02; F16B 2033/025; F16B 33/04
(Continued)

(56) References Cited

U.S. PATENT DOCUMENTS 5,482,176 A * 1/1996 Maietta .................. B65D 5/748 215/220
7,540,405 B2 * 6/2009 Sase ....................... B65D 5/748 229/125.14
2002/0179605 A1 12/2002 Miani et al.

FOREIGN PATENT DOCUMENTS

CN 206552515 U 10/2017
CN 108190230 A 6/2018
(Continued)

OTHER PUBLICATIONS

International Search Report From PCT/CN2023/107496, Dated Oct. 12, 2023.

*Primary Examiner* — David J Walczak
(74) *Attorney, Agent, or Firm* — Carmel Patent Agency; Robert Ballarini

(57) ABSTRACT

A spout packaging structure includes a spout structure, a cutting element, and a cap. The spout structure includes a fixing part and a mouth part connected to the fixing part. The mouth part has a cylindrical structure and first internal threads. Each protruding tooth structure of the first internal threads is provided with first and second inclined surfaces located on two sides of the protruding tooth structure with a recessed structure between two adjacent protruding ones. The first inclined surface faces the fixing part. Within a same cross section through the mouth part's axis, the bottom of the recessed structure has a tangent parallel to the mouth part's axis, angle α between the first inclined surface and the tangent is 110°-145°, and angle β between the second
(Continued)

inclined surface and the tangent is at least 90°. The cutting element is sleeved in the mouth part with first external threads.

22 Claims, 2 Drawing Sheets

(58) Field of Classification Search
USPC ....... 222/81, 83, 90, 91, 566, 567, 568, 570, 222/573; 215/264, 276, 283, 329; 411/436, 413, 415
See application file for complete search history.

(56) References Cited

FOREIGN PATENT DOCUMENTS

| | | | |
|---|---|---|---|
| CN | 208828405 | U | 5/2019 |
| CN | 215045256 | U | 12/2021 |
| CN | 217706944 | U | 11/2022 |
| CN | 217706945 | U | 11/2022 |
| JP | 2000344265 | A | 12/2000 |

* cited by examiner

SPOUT PACKAGING STRUCTURE OF PACKAGING BOX, AND PACKAGING BOX

CROSS-REFERENCE TO RELATED APPLICATIONS

The present application is a § 371 National Phase of International Patent Application No. PCT/CN2023/107496, filed Jul. 14, 2023, which claims priority to Chinese Patent Application No. 202210845148.X, filed with the China National Intellectual Property Administration on Jul. 18, 2022 and entitled "Spout packaging structure of packaging box and packaging box", which is incorporated herein by reference in its entirety; and the present application claims priority to Chinese Patent Application No. 202210843849.X, filed with the China National Intellectual Property Administration on Jul. 18, 2022 and entitled "Spout packaging structure of packaging box and packaging box", the entire contents of all of which are incorporated herein by reference in its entirety.

TECHNICAL FIELD

The present application relates to the field of spout packaging structure of packaging box and packaging box.

BACKGROUND

Currently, some beverage packaging boxes have a mouth portion on a box body, and a cap is connected to the mouth portion. To ensure sealing of packaging, a sealing layer is disposed at one end of the mouth portion that faces the box body, and the sealing layer is in sealed connection with a top side of the box body. For drinking a beverage, the sealing layer on a top layer of the packaging boxes needs to be cut from the inside of the mouth portion. Currently, the mouth portion is in threaded connection with the cap, and a cutting element for cutting the sealing layer is disposed on an inner side of the mouth portion. An outer periphery of the cutting element is provided with an external thread, and an inner side of the mouth portion is provided with an internal thread for fit connection with the external thread of the cutting element. When the cutting element is driven to rotate, it fits with the internal thread of the mouth portion and moves downward while rotating. Since downward rotation requires certain pressure, a certain depth is set for the threaded fitting between the cutting element and the mouth portion, to allow the cutting element to move downward smoothly with the rotation. However, when the mouth portion is manufactured by cast molding, a casting needs to be pushed out during demolding. Since the internal thread of the mouth portion is deep, a greater thrust is required, which makes demolding difficult and easily causes deformation of the casting, thus increasing the difficulty of manufacturing. Therefore, the problem of difficulty in demolding the mouth portion casting needs to be urgently resolved.

SUMMARY

The present application discloses a packaging box and a spout packaging structure thereof. In the spout packaging structure of the packaging box, an inclination angle of a surface that hinders demolding is appropriately increased, so that surfaces on both sides of a protruding tooth structure of a first internal thread of a mouth portion have suitable angles, which is conductive to reducing demolding resistance during manufacturing by cast molding, making demolding smooth, and reducing wear, undercut, and the like of the first internal thread.

To achieve the foregoing objective, the present application provides the following technical solutions:

a spout packaging structure of a packaging box, including:

a spout structure, where the spout structure includes a fixing portion for securing to a box body of the packaging box, and a mouth portion connected to the fixing portion, the mouth portion is located on one side of the fixing portion that is away from the box body, the mouth portion has a cylindrical structure, and an inner side of a cylindrical wall of the mouth portion is provided with a first internal thread; any one of protruding tooth structures of the first internal thread has a first inclined surface and a second inclined surface which are located on both sides of the protruding tooth structure, and the first inclined surface faces the fixing portion, and a recessed structure is formed between any two adjacent protruding tooth structures of the first internal thread; in the same cross section passing through an axis of the mouth portion, the bottom of the recessed structure has a tangent line parallel to the axis of the mouth portion, an angle α with an opening facing toward the fixing portion is formed between the first inclined surface and the tangent line, the angle α is greater than or equal to 110° and less than or equal to 145°, an angle β with an opening facing away from the fixing portion is formed between the second inclined surface and the tangent line, and the angle β is greater than or equal to 90°;

a cutting element, where the cutting element has a cylindrical structure, the cutting element is configured to be sleeved in the mouth portion, an outer side of a cylindrical wall of the cutting element is provided with a first external thread for fit connection with the first internal thread, and the cutting element is configured to cut a sealing layer on a top side of the box body; and a cap, where the cap is configured for fit connection with the mouth portion and to close an opening on a top side of the mouth portion.

In the spout packaging structure of the packaging box, an inclination angle of a surface that hinders demolding is appropriately increased, so that surfaces on both sides of the protruding tooth structure of the first internal thread of the mouth portion have suitable angles, which is conductive to reducing demolding resistance during manufacturing by cast molding, making demolding smooth, and reducing wear, undercut, and the like of the first internal thread.

Optionally, the angle α is greater than or equal to 120° and less than or equal to 135°.

Optionally, the angle α is 125°.

Optionally, the angle β is greater than or equal to 100° and less than or equal to 120°.

Optionally, the angle β is 110°.

Optionally, the curvature of a top portion of the protruding tooth structure is greater than or equal to 0.15 mm.

Optionally, the surface roughness Ra of the first internal thread is less than or equal to 1.00 μm.

Optionally, the first internal thread is located in a threaded area on the cylindrical wall of the mouth portion, and the thread depth of the first internal thread is greater than or equal to 55% of the wall thickness of the threaded area, where the thread depth of the first internal thread is a dimension from a top side of the protruding tooth structure to an inner surface of the mouth portion in the same radial direction of the mouth portion.

Optionally, the thread depth of the first internal thread is greater than or equal to 60% and less than or equal to 130% of the wall thickness of the threaded area.

Optionally, the thread depth of the first internal thread is greater than or equal to 90% and less than or equal to 110% of the wall thickness of the threaded area.

Optionally, the mouth portion is further provided with a non-threaded area in an extension direction of the axis of the mouth portion, the non-threaded area is located on one side of the threaded area that is away from the fixing portion, and the non-threaded area is located on a top portion of the mouth portion, and the wall thickness of a top side of the non-threaded area is greater than or equal to 75% of the wall thickness of the threaded area.

Optionally, the thread depth of the first internal thread is greater than or equal to 80% of the wall thickness of the top side of the non-threaded area and less than the wall thickness of the top side of the non-threaded area.

Optionally, an outer side of the cylindrical wall of the mouth portion is provided with a second external thread; and an inner side of a side wall of the cap is provided with a second internal thread for fit connection with the second external thread.

Optionally, a driving structure is disposed on an inner side of a tubular wall of the cutting element, a top wall of the cap is provided with a pushing structure extending toward an opening direction of the cap, the pushing structure is configured to fit with the driving structure, and when the cap is rotated for opening for the first time, the pushing structure drives the cutting element to rotate, so that the cutting element moves toward the fixing portion in an extension direction of the axis of the mouth portion.

Optionally, one side of the cutting element that faces the fixing portion is provided with at least one cutting tooth.

Optionally, the fixing portion has a flange structure including a cylindrical connecting segment connected to the mouth portion, and a flange that extends outward and that is connected to a side of one end of the cylindrical connecting segment that is away from the mouth portion.

Optionally, the end of the cylindrical connecting segment that is away from the mouth portion is provided with a sealing portion that closes an inner hole of the cylindrical connecting segment, the sealing portion has an annular thinned area opposite to the cylindrical wall of the cutting element, the thickness of the thinned area of the sealing portion is smaller than the thickness of a central area of the sealing portion, and the cutting element is configured to cut the thinned area.

Optionally, the thickness of the thinned area of the sealing portion is less than 50% of the thickness of the central area of the sealing portion.

Optionally, the thickness of the thinned area of the sealing portion is less than 30% of the thickness of the central area of the sealing portion.

Optionally, the roughness Ra of a surface, of the central area of the sealing portion, that faces the mouth portion is greater than or equal to 1.00 μm.

Optionally, the spout structure is fabricated by cast molding.

The present application further provides a packaging box, including any one of the spout packaging structures of a packaging box according to the above technical solutions, and a box body, where the spout packaging structure is connected to a top side of the box body, and a fixing portion of the spout packaging structure is connected and secured to the top side of the box body.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments that are presently preferred. It is understood, however, that the invention is not limited to the precise arrangements and instrumentalities shown. In the drawings.

REFERENCE NUMERALS

1—spout packaging structure;
2—box body;
11—spout structure;
12—cutting element;
13—cap;
111—mouth portion;
112—fixing portion;
113—sealing portion;
114—first internal thread;
115—second external thread;
121—first external thread;
122—cutting tooth;
131—second internal thread;
1121—flange;
1131—thinned area;
1132—central area;
1141—protruding tooth structure;
1142—first inclined surface;
1143—second inclined surface.

DETAILED DESCRIPTION OF THE PREFERRED EMBODIMENTS

The technical solutions in the examples of the present application will be clearly and fully described with reference to the accompanying drawings of the examples of the present application. Clearly, the described examples are merely some rather than all of the examples of the present application. Based on the examples of the present application, all other examples derived by a person of ordinary skill in the art without creative efforts should fall within the protection scope of the present application.

Figure 1:
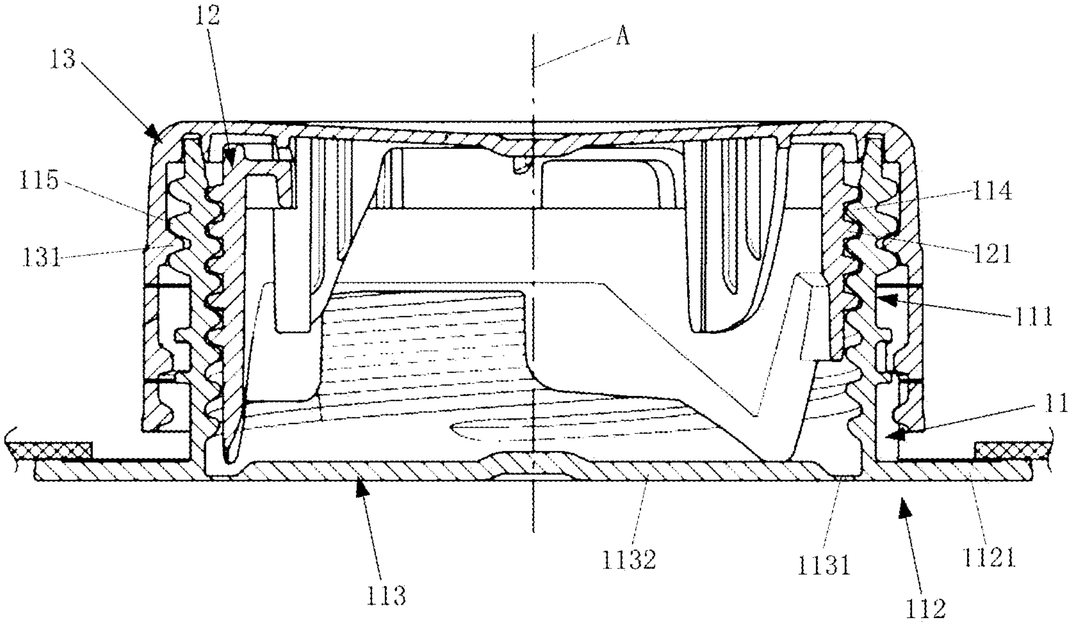
FIG. 1 is a schematic sectional view of a spout packaging structure of a packaging box according to an example of the present application.
Figure 2:
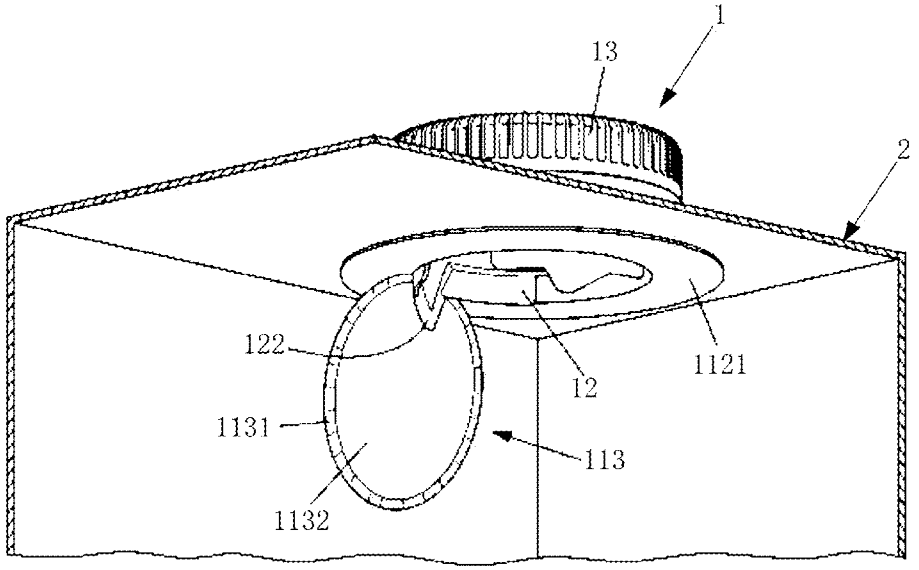
FIG. 2 is a schematic diagram of a partial structure of a packaging box according to an example of the present application.
Figure 3:
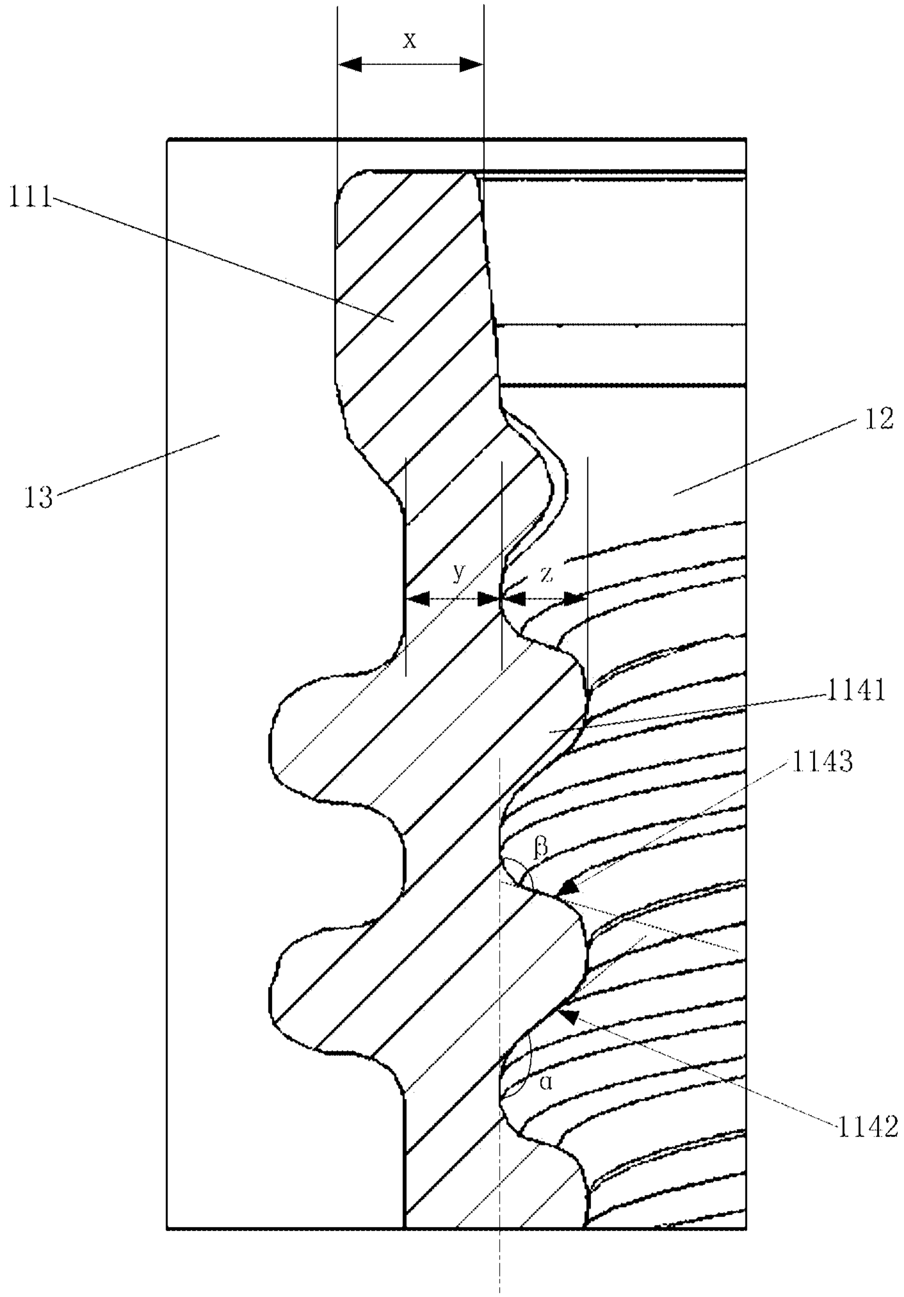
FIG. 3 is a schematic diagram of a partial sectional structure of a spout packaging structure of a packaging box according to an example of the present application.

As shown in FIG. 1, FIG. 2, and FIG. 3, an example of the present application provides a spout packaging structure of a packaging box. For ease of description, the description is provided based on in an upright position of the packaging box. Moreover, upright position of the packaging box means that one side of a box body of the packaging box that is away from a mouth portion is at the bottom, the bottom of the box body is facing downward, and the mouth portion is in an upward position. In this example, a spout packaging structure 1 includes a spout structure 11, a cutting element 12, and a cap 13, where the packaging box has a box body 2, a top side of the box body is provided with an opening for a beverage to pass through, the spout structure is disposed on a top side of the packaging box, and the spout structure is corresponding to the opening. Specifically, the spout structure 11 includes a fixing portion 112 fixedly connected to the box body 2 of the packaging box, and a mouth portion 111 connected to the fixing portion 112. The fixing portion 112 is fixedly connected to the top side of the box body, specifically by bonding, and the mouth portion 111 is located on one side of the fixing portion 112 that is away from the box body. The mouth portion 111 has a cylindrical structure, an opening is formed at a top end of the mouth portion 111, an inner hole of the mouth portion 111 is opposite to and can communicate with the opening on the top side of the box body, so that the beverage in the box body can flow out. The cutting element 12 also has a cylindrical structure, and the cutting element 12 is sleeved on an inner side of the mouth portion 111 and located in the inner hole of the mouth portion 111. The cutting element 12 is configured to cut a sealing layer, on the top side of the box body, that is opposite to the mouth portion 111, and an outer side of a tubular wall of the cutting element 12 is in threaded connection with the inner side of the mouth portion 111. Specifically, an inner side of a cylindrical wall of the mouth portion 111 is provided with a first internal thread 114, an outer side of a cylindrical wall of the cutting element 12 is provided with a first external thread 121, and the first external thread 121 is in fit connection with the first internal thread 114. The cutting element 12 moves downward during rotation, and one end of the cutting element that faces the box body is configured to cut the sealing layer on the top side of the box body. For a structure of the first internal thread, the first internal thread is formed from continuous protruding tooth structures spirally extending on an inner wall of the mouth portion, and any one of protruding tooth structures 1141 of the first internal thread 114 has a first inclined surface 1142 and a second inclined surface 1143 which are located on both sides of the protruding tooth structure and which are oppositely disposed. The first inclined surface 1142 and the second inclined surface 1143 are distributed along an extension direction of an axis A of the mouth portion 111, orientations of the first inclined surface 1142 and the second inclined surface 1143 are away from each other, the first inclined surface 1142 faces the fixing portion 112, and the second inclined surface 1143 faces the opening of the mouth portion 111. A recessed structure is formed between any two adjacent protruding tooth structures 1141 of the first internal thread 114. In the same cross section passing through the axis A of the mouth portion 111, the bottom of the recessed structure has a tangent line parallel to the axis A of the mouth portion 111, an angle $\alpha$ with an opening facing toward the fixing portion is formed between the first inclined surface and the tangent line, the angle $\alpha$ is greater than or equal to 110° and less than or equal to 145°, an angle $\beta$ with an opening facing away from the fixing portion is formed between the second inclined surface and the tangent line, and the angle $\beta$ is greater than or equal to 90°. The spout structure is manufactured by cast molding. When the spout structure 11 is manufactured by cast molding, during demolding, a mold inside the mouth portion is released from the opening at the top end of the mouth portion, and the angle $\alpha$ is set between 110° and 145° along a release direction, so that an inclination angle of the first inclined surface of the protruding tooth structure that is opposite to the release direction is increased, that is, an inclination angle of a surface of the protruding tooth structure that hinders demolding is increased, thereby weakening hindering capability of a wall surface of the protruding tooth structure that hinders demolding, reducing friction, and helping reduce resistance during demolding. In addition, the angle $\beta$ is set to be greater than or equal to 90°, so that the mold and the mouth portion are easier to be separated, which helps alleviate thread undercut, wear, and the like, and is conductive to smooth demolding. The cap 13 is configured to cover the top side of the mouth portion, achieve fit connection with the mouth portion 111, and close the opening on the top side of the mouth portion 111, which is conductive to dust-proofing, thereby ensuring that the mouth portion is clean.

In the spout packaging structure of the packaging box, an inclination angle of a surface that hinders demolding is appropriately increased, so that surfaces on both sides of the protruding tooth structure of the first internal thread of the mouth portion have suitable angles, which is conductive to reducing demolding resistance during manufacturing by cast molding, making demolding smooth, and reducing wear, undercut, and the like of the first internal thread.

In a specific embodiment, the angle $\alpha$ may be set to be greater than or equal to 120° and less than or equal to 135°, and a more suitable inclination angle of the first inclined surface may be further set, which is more conductive to reducing thread wear during demolding. Preferably, the angle $\alpha$ may be set to 125°, 130°, 132°, or another angle, which can make demolding smooth during manufacturing by cast molding, reduce a thrust during demolding, and reduce thread wear and undercut.

In addition, specifically, the angle $\beta$ may be set to be greater than or equal to 100° and less than or equal to 120°, and a more suitable inclination angle of the second inclined surface may be further set, so that the thread is easier to be separated from the mold during demolding, which is conductive to reducing wear and undercut. Preferably, the angle $\beta$ may be 110°, 113°, 115°, or another angle, which can make demolding smoother during manufacturing, and reduce thread wear and undercut.

In a possible embodiment, the curvature of a top portion of the protruding tooth structure 1141 may be set to be greater than or equal to 0.15 mm for easier demolding. The first inclined surface and the second inclined surface of the protruding tooth structure are connected at the top portion, where the curvature of the top portion of the protruding tooth structure is set to be greater than or equal to 0.15 mm, a smooth structure is formed on the top portion of the protruding tooth structure, and the first inclined surface and the second inclined surface have a smooth transition on the top portion, so that the top portion of the protruding tooth structure is not too sharp, which is conductive to reducing wear and resistance during demolding, making demolding smoother, and improving work efficiency. Specifically, the curvature of the top portion of the protruding tooth structure may be set to 0.16 mm, 0.18 mm, or 0.20 mm.

According to another aspect, to make demolding smoother, in a possible embodiment, the surface roughness Ra of the first internal thread 114 is less than or equal to 1.00 μm. During manufacturing by casting, the roughness of a product is mainly affected by the roughness of a mold. Therefore, the roughness Ra of the first internal thread is limited to be less than or equal to 1.00 μm, the roughness Ra of the surface of the mold that contacts the spout structure is set to be less than 1.00 μm, so that a surface of the first internal thread can reach a certain degree of smoothness, which is conductive to reducing friction and resistance during demolding, and reducing wear of the first internal thread.

Currently, for some beverage packaging boxes, cutting elements can be driven to rotate, so that the cutting elements move downward while rotating, and sealing layers can then be pierced and cut to conveniently form openings for beverages to flow out. However, a cutting element and a mouth portion are manufactured with an allowable deviation, when the cutting element is at a lower limit of tolerance, and the mouth portion is at a higher limit of tolerance, a threaded fit between the mouth portion and the cutting element is poor, and a force is required for the cutting element to move downward to pierce and cut a sealing layer. Therefore, when the cutting element is driven to rotate, it is easy to slip between the cutting element and the mouth portion, and the cutting element rotates in an original position and cannot move downward, so that opening cannot be achieved. Therefore, it is urgent to resolve the problem that the cutting element cannot open the sealing layer.

As shown in FIG. 3, on the basis of the spout packaging structure, in a possible embodiment, the cylindrical wall of the mouth portion 111 has a threaded area, the first internal thread 114 is located in the threaded area of the cylindrical wall of the mouth portion, and the thread depth z of the first internal thread 114 is set to be greater than or equal to 55% of the wall thickness y of the threaded area, where the thread depth z of the first internal thread 114 is a dimension from a top side of the protruding tooth structure 1141 to an inner surface of the mouth portion 111 in the same radial direction of the mouth portion 111, where the inner surface of the mouth portion 111 is the bottom of a groove between two adjacent protruding tooth structures, that is, a dimension from the top side of the protruding tooth structure 1141 to the bottom of the recessed structure, and the wall thickness y of the threaded area is a dimension from an inner surface to an outer wall surface of the cylindrical wall of the threaded area in a radial direction of the mouth portion. The outer side of the cylindrical wall of the cutting element 12 is provided with a first external thread 121 in fit connection with the first internal thread 114. Similarly, since the first external thread 121 of the cutting element 12 fits with the first internal thread 114, the thread depth of the first external thread 121 may be the same as the thread depth of the first internal thread, or the thread depth of the first external thread 121 may be slightly larger than the thread depth of the first internal thread 114, as long as the first internal thread 114 can properly fit with the first external thread 121. The cutting element is in threaded fit with the mouth portion, and the cutting element moves downward during rotation. The first internal thread is set with the thread depth of the first internal thread on the inner side of the mouth portion being greater than or equal to 55% of the wall thickness of the threaded area, so that there is an appropriate ratio between the thread depth of the first internal thread and the wall thickness of the threaded area of the mouth portion, thereby ensuring a certain wall thickness of the threaded area of the mouth portion, ensuring structural strength of the cylindrical wall of the mouth portion, ensuring structural stability of the mouth portion, and increasing the thread depth of the first internal thread, so that a contact fitting surface between the first internal thread of the mouth portion and the first external thread of the cutting element increases; when the cutting element rotates, the first external thread of the cutting element can stably contact with the first internal thread, and spirals downward under a downward pressure; and when a lower end of the cutting element cuts the sealing layer of the box body, the cutting element can also stably rotate downward to avoid slipping, so as to successfully cut an opening.

In a specific embodiment, for the ratio between the thread depth z of the first internal thread 114 and the wall thickness y of the threaded area of the mouth portion 111, the thread depth z of the first internal thread 114 may be set to be greater than or equal to 60% and less than or equal to 130% of the wall thickness y of the threaded area. A fitting area between the first internal thread of the mouth portion and the first external thread of the cutting element can be further increased by selecting the ratio of the thread depth of the first internal thread 114 to the wall thickness of the threaded area within a suitable range, which is more conductive to the cutting element to smoothly rotate downward, avoiding slipping when cutting the sealing layer of the box body, and ensuring that the cutting element can successfully cut an opening in the sealing layer of the box body.

More preferably, the thread depth z of the first internal thread 114 may be further set to be greater than or equal to 90% and less than or equal to 110% of the wall thickness y of the threaded area. Therefore, there is a more appropriate ratio between the thread depth of the first internal thread and the wall thickness of the threaded area of the mouth portion, so that there is a more appropriate fitting area between the first internal thread of the mouth portion and the first external thread of the cutting element, and an effective threaded fit is maintained between the first internal thread of the mouth portion and the first external thread of the cutting element to prevent slipping, and ensure that the cutting element can cut an opening in the sealing layer of the box body. In a specific embodiment, the thread depth z of the first internal thread 114 may be 92%, 95%, 98%, or 105% of the wall thickness y of the threaded area, so that an effective threaded fit is maintained between the first internal thread of the mouth portion and the first external thread of the cutting element to avoid slipping.

In a possible embodiment, the thread depth z of the first internal thread may be set to 0.5 mm-0.55 mm, and specifically, the thread depth z of the first internal thread may be set to 0.52 mm, 0.53 mm, or 0.54 mm, so that an effective fit is maintained between the first internal thread and the first external thread to avoid slipping.

Referring to FIG. 3, in a possible embodiment, the mouth portion 111 is further provided with a non-threaded area in an extension direction of the axis A of the mouth portion 111, the non-threaded area is located on one side of the threaded area that is away from the fixing portion 112, and the non-threaded area is located on a top portion of the mouth portion 111, and the wall thickness x of a top side of the non-threaded area is greater than or equal to 75% of the wall thickness y of the threaded area. The non-threaded area of the mouth portion is on the top side of the mouth portion, and an end face of the non-threaded area that is away from the threaded area is a top face of the mouth portion. In this example, the spout structure is manufactured by cast molding, the end face on the top side of the mouth portion is a thrust acting face during demolding, and a width of the end face on the top side of the mouth portion is set to be greater than or equal to 75% of the wall thickness of the threaded area, so that the end face on the top side of the mouth portion has a certain width, and the width can be referred to as an ejection width during demolding, which is convenient for applying a force during demolding, conductive to smooth demolding, and convenient for manufacturing the spout structure by cast molding.

Preferably, to better set the ejection width, a relationship between the thread depth of the first internal thread and the wall thickness of the non-threaded area is set as follows: the thread depth z of the first internal thread 114 is greater than or equal to 80% of the wall thickness x of the top side of the non-threaded area and less than the wall thickness x of the top side of the non-threaded area. Therefore, the top side of the mouth portion has a more suitable ejection width, which is convenient for demolding when the spout structure is manufactured by cast molding, and conductive to improving manufacturing efficiency.

In a possible embodiment, as shown in FIG. 1, the mouth portion 111 is in threaded connection with the cap 13, specifically, an outer side of the cylindrical wall of the mouth portion 111 is provided with a second external thread 115; and an inner side of a side wall of the cap 13 is provided with a second internal thread 131 for fit connection with the second external thread 115. In this way, connection between the cap and the mouth portion is stronger and tighter.

On the basis of the spout packaging structure, in a possible embodiment, as shown in FIG. 1 and FIG. 2, a driving structure is disposed on an inner side of a tubular wall of the cutting element 12, a top wall of the cap 13 is provided with a pushing structure extending toward an opening direction of the cap, the pushing structure is configured to fit with the driving structure, and when the cap 13 is rotated for opening for the first time, the pushing structure is in contact fit with the driving structure, and the pushing structure may apply a rotating force to the driving structure, so that the pushing structure drives the cutting element 12 to rotate. Therefore, the cutting element 12 may move toward the fixing portion 112 in an extension direction of the axis of the mouth portion 111 during rotation. When the cap is unscrewed for the first time, the pushing structure on the inner side of the cap fits with the driving structure of the cutting element, and rotation of the cap drives the cutting element to rotate. The cutting element is in threaded fit with the inner side of the cap, a spiral direction is downward, exactly, the cutting element moves downward during the rotation. When the cap is rotated to fully open, the cutting element is driven to rotate and move downward, the lower end of the cutting element can cut an opening in the sealing layer on the top side of the box body. The operation process is simple and reliable, and the opening is cut in the sealing layer when the cap is opened, which is just convenient for a user to drink. It is very convenient.

Specifically, as shown in FIG. 2, one side of the cutting element 12 that faces the fixing portion 112 is provided with at least one cutting tooth 122, the cutting tooth 122 has a cutting tip, and the cutting tip faces the box body, so as to cut a cutting film. Preferably, the lower end of the cutting element may be provided with two cutting teeth, three cutting teeth, or four cutting teeth, or a plurality of cutting teeth arranged circumferentially around the axis of the cutting element may be disposed, so that the sealing layer can be cut more quickly.

Referring to FIG. 1, in a possible embodiment, the fixing portion 112 has a flange structure including a cylindrical connecting segment connected to the mouth portion 111, and a flange 1121 that extends outward and that is connected to a side of one end of the cylindrical connecting segment that is away from the mouth portion 111. The flange may be fixedly connected to the box body, and specifically, the flange may be secured to the top side of the box body by bonding, and the fixing portion and the mouth portion form an integrated structure and can be manufactured in the same cast molding process, with better structural stability and better structural strength.

Further, still referring to FIG. 1, the end of the cylindrical connecting segment that is away from the mouth portion 111 is provided with a sealing portion 113 that closes an inner hole of the cylindrical connecting segment. After the flange is secured to the top side of the box body, sealing performance is also very good. A surface where the flange is located is formed integrally with a connecting surface on the top side. A sealing portion is disposed on a surface flush with the flange and at a position opposite to the inner hole of the cylindrical connecting segment, which is equivalent to sealing on the top side of the box body. The sealing portion may be reused as a part of the sealing layer on the top side of the box body, the sealing portion 113 has an annular thinned area 1131 opposite to the cylindrical wall of the cutting element 12, the thickness of the thinned area 1131 of the sealing portion 113 is smaller than the thickness of a central area 1132 of the sealing portion 113, and the cutting element is configured to cut the thinned area 1131. The thickness of the thinned area is small, and thus a cutting force is reduced, so that it is convenient for the cutting element to cut smoothly, which is conducive to avoiding slipping of the threaded fit between the cutting element and the mouth portion, and ensuring that the cutting element can successfully cut an opening in the sealing portion.

Specifically, with regard to setting of the thinned area of the sealing portion, the thickness of the thinned area 1131 of the sealing portion 113 may be selected to be less than 50% of the thickness of the central area 1132 of the sealing portion 113. In this way, the thickness of the thinned area of the sealing portion is not too small to lose a sealing effect, and the thinned area can be easily cut and opened. More preferably, on the basis of ensuring sealing performance of the sealing portion, the thickness of the thinned area 1131 of the sealing portion 113 may be set to be less than 30% of the thickness of the central area 1132 of the sealing portion 113, so that the thinned area is easier to be cut, thereby reducing a cutting resistance of the cutting element, and ensuring a success rate of opening.

Specifically, with regard to setting of the surface roughness of the sealing portion 113, the roughness Ra of a surface, of the central area 1132 of the sealing portion 113, that faces the mouth portion 111 may be set to be greater than or equal to 1.00 μm, that is, during manufacturing by cast molding, the roughness Ra of a surface, of a portion of a mold and corresponding to the surface, of the central area 1132 of the sealing portion, that faces the mouth portion 111 is greater than or equal to 1.00 μm.

Specifically, the sealing structure has an integrated structure formed by cast molding, and has good overall structure, stability and reliability.

In addition, as shown in FIG. 2, this example further provides a packaging box, including any one of the spout packaging structure 1 of a packaging box according to the above examples, and a box body 2, where the spout packaging structure 1 is connected to a top side of the box body 2, and a fixing portion 112 of the spout packaging structure 1 is connected and secured to the top side of the box body 2.

It will be apparent to those skilled in the art that various modifications and variations can be made to the examples of the present application without departing from the spirit and scope of the present application. Thus, if these modifications and variations of the present application fall within the scope of the claims of the present application and equivalent technologies thereof, the present application is also intended to include these modifications and variations.

The invention claimed is:

1. A spout packaging structure of a packaging box, the spout packaging structure comprising:

a spout structure, wherein the spout structure comprises a fixing portion for securing to a box body of the packaging box, and a mouth portion connected to the fixing portion, the mouth portion is located on one side of the fixing portion that is away from the box body, the mouth portion has a cylindrical structure, and an inner side of a cylindrical wall of the mouth portion is provided with a first internal thread; any one of protruding tooth structures of the first internal thread has a first inclined surface and a second inclined surface which are located on both sides of the protruding tooth structure, and the first inclined surface faces the fixing portion, and a recessed structure is formed between any two adjacent protruding tooth structures of the first internal thread; in a same cross section passing through an axis of the mouth portion, the bottom of the recessed structure has a tangent line parallel to the axis of the mouth portion, an angle α with an opening facing toward the fixing portion is formed between the first inclined surface and the tangent line, the angle α is greater than or equal to 110° and less than or equal to 145°, an angle β with an opening facing away from the fixing portion is formed between the second inclined surface and the tangent line, and the angle β is greater than or equal to 90°;

a cutting element, wherein the cutting element has a cylindrical structure, the cutting element is configured to be sleeved in the mouth portion, an outer side of a cylindrical wall of the cutting element is provided with a first external thread for fit connection with the first internal thread, and the cutting element is configured to cut a sealing layer on a top side of the box body; and a cap, wherein the cap is configured for fit connection with the mouth portion and to close an opening on a top side of the mouth portion.

2. The spout packaging structure of a packaging box according to claim 1, wherein the angle α is greater than or equal to 120° and less than or equal to 135°.

3. The spout packaging structure of a packaging box according to claim 2, wherein the angle α is 125°.

4. The spout packaging structure of a packaging box according to claim 1, wherein the angle β is greater than or equal to 100° and less than or equal to 120°.

5. The spout packaging structure of a packaging box according to claim 4, wherein the angle β is 110°.

6. The spout packaging structure of a packaging box according to claim 1, wherein a curvature of a top portion of the protruding tooth structure is greater than or equal to 0.15 mm.

7. The spout packaging structure of a packaging box according to claim 1, wherein the first internal thread has a surface roughness less than or equal to 1.00 μm.

8. The spout packaging structure of a packaging box according to claim 1, wherein the first internal thread is located in a threaded area on the cylindrical wall of the mouth portion, and a thread depth of the first internal thread is greater than or equal to 55% of a wall thickness of the threaded area, wherein the thread depth of the first internal thread is a dimension from a top side of the protruding tooth structure to an inner surface of the mouth portion in the same radial direction of the mouth portion.

9. The spout packaging structure of a packaging box according to claim 8, wherein the thread depth of the first internal thread is greater than or equal to 60% and less than or equal to 130% of the wall thickness of the threaded area.

10. The spout packaging structure of a packaging box according to claim 9, wherein the thread depth of the first internal thread is greater than or equal to 90% and less than or equal to 110% of the wall thickness of the threaded area.

11. The spout packaging structure of a packaging box according to claim 8, wherein the mouth portion is further provided with a non-threaded area in an extension direction of the axis of the mouth portion, the non-threaded area is located on one side of the threaded area that is away from the fixing portion, and the non-threaded area is located on a top portion of the mouth portion, and a wall thickness of a top side of the non-threaded area is greater than or equal to 75% of the wall thickness of the threaded area.

12. The spout packaging structure of a packaging box according to claim 11, wherein the thread depth of the first internal thread is greater than or equal to 80% of the wall thickness of the top side of the non-threaded area and less than the wall thickness of the top side of the non-threaded area.

13. The spout packaging structure of a packaging box according to claim 1, wherein an outer side of the cylindrical wall of the mouth portion is provided with a second external thread; and an inner side of a side wall of the cap is provided with a second internal thread for fit connection with the second external thread.

14. The spout packaging structure of a packaging box according to claim 13, wherein a driving structure is disposed on an inner side of a tubular wall of the cutting element, a top wall of the cap is provided with a pushing structure extending toward an opening direction of the cap, the pushing structure is configured to fit with the driving structure, and when the cap is rotated for opening for the first time, the pushing structure drives the cutting element to rotate, so that the cutting element moves toward the fixing portion in an extension direction of the axis of the mouth portion.

15. The spout packaging structure of a packaging box according to claim 1, wherein one side of the cutting element that faces the fixing portion is provided with at least one cutting tooth.

16. The spout packaging structure of a packaging box according to claim 1, wherein the fixing portion has a flange structure comprising a cylindrical connecting segment connected to the mouth portion, and a flange that extends outward and that is connected to a side of one end of the cylindrical connecting segment that is away from the mouth portion.

17. The spout packaging structure of a packaging box according to claim 16, wherein the end of the cylindrical connecting segment that is away from the mouth portion is provided with a sealing portion that closes an inner hole of the cylindrical connecting segment, the sealing portion has an annular thinned area opposite to the cylindrical wall of the cutting element, a thickness of the thinned area of the sealing portion is less than a thickness of a central area of the sealing portion, and a cutting element is configured to cut the thinned area.

18. The spout packaging structure of a packaging box according to claim 17, wherein the thickness of the thinned area of the sealing portion is less than 50% of the thickness of the central area of the sealing portion.

19. The spout packaging structure of a packaging box according to claim 18, wherein the thickness of the thinned area of the sealing portion is less than 30% of the thickness of the central area of the sealing portion.

20. The spout packaging structure of a packaging box according to claim 17, wherein a roughness of a surface, of the central area of the sealing portion, that faces the mouth portion is greater than or equal to 1.00 μm.

21. The spout packaging structure of a packaging box according to claim 1, wherein the spout structure is fabricated by cast molding.

22. A packaging box, comprising the spout packaging structure of a packaging box according to claim 1, and a box body, wherein the spout packaging structure is connected to a top side of the box body, and the fixing portion of the spout packaging structure is connected and secured to the top side of the box body.

* * * * *